Figure 1:
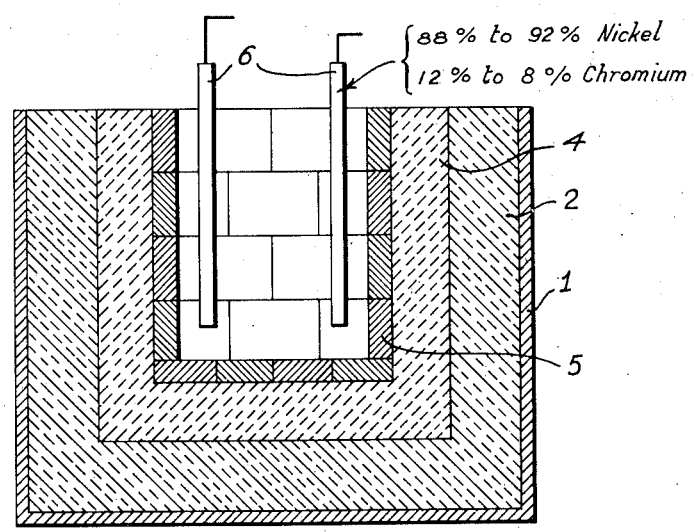

Aug. 1, 1944. A. F. HOLDEN 2,354,753
SALT BATH FURNACE
Filed April 25, 1942

INVENTOR
ARTEMAS F. HOLDEN
BY
ATTORNEYS

Patented Aug. 1, 1944

2,354,753

UNITED STATES PATENT OFFICE 2,354,753

SALT BATH FURNACE

Artemas F. Holden, Northford, Conn.

Application April 25, 1942, Serial No. 440,443

6 Claims. (Cl. 13—23)

The present invention relates to metallurgy and more especially to a type of electric furnace for heat treatment of metals by the use of salt baths of the chloride or fluoride type.

More specifically, the present invention relates to a pot and to electrodes of an electric furnace adapted for use in a heat treatment salt bath of the chloride or fluoride type, and the present invention comprises a pot lining which does not react with a chloride or fluoride salt bath and wherein the use of certain electrodes in connection with the pot prevents contamination of the bath and formation of sludges.

Fig. 1 illustrates a cross-section of a pot for heat treatment baths in which the present invention is embodied.

In the present invention, the bricks comprising the lining for the pot are the well known silica-alumina refractory types of bricks which are treated by submersion in a solution which produces aluminum hydrate. Preferably, the solution is a water saturated solution and the bricks are immersed therein until thoroughly saturated. More specifically the porous silica-alumina bricks are soaked in a saturated solution of aluminum chloride or sulphate. Then these bricks are soaked in a solution of ammonium hydroxide. This produces a precipitate of aluminum hydroxide which is dispersed a substantial depth within the bricks and also coats the surface thereof. The bricks are washed and dried and when the bricks are heated the aluminum hydroxide is changed to alumina which is dispersed not only on the surface of the bricks but to a substantial depth within the bricks. Preferably the heating or firing of the bricks after treatment is up to a temperature substantially the same as the original temperature at which the bricks were previously fired.

The pot is built up in the usual way with a master shell 1 enclosing heat insulation 2 which in turn supports rammed refractory material 4 that is lined with the silica-alumina refractory bricks 5 which have been treated with the aluminum hydrate.

After the pot has been constructed, it is filled slightly beyond the height at which the bath is intended to be run in regular operation, with the predominant chloride of the chloride bath that will be normally used when the pot is in operation. The chloride may be an alkali metal chloride or an alkali earth metal chloride or a mixture of both. For example, if the predominant chloride in the bath to be used is barium chloride, then barium chloride is used to fill the pot at this stage; if sodium chloride is the predominant substance, then sodium chloride is used to fill the pot. The selected chloride is then heated through electrodes, from ten to forty-eight hours, and until a thoroughly stabilized temperature is reached. This stabilized temperature should be well above the melting point of the particular chloride used so that the refractory bricks will be thoroughly heated. After the furnace has been run at the stabilized temperature until the lining has been thoroughly heated, a sufficient amount of selected chloride is bailed out and additional other chemicals are added to make up the completed working bath. For example, one bath which may be used for temperatures between 1300° F. and 2000° F. is a barium chloride 60% to 90% plus potassium chloride 40% to 10%. In this case, after the barium chloride has been heated as and for the time specified, a proportionate amount, for example, 40% of the barium chloride is bailed out and 40% potassium chloride is added, thereby making the working bath which is now ready for commercial operation.

Another bath which may be used is an alkali metal or an alkali earth metal chloride or a mixture of both, plus an alkali metal or an alkali earth metal chloride or a mixture of both, for example, barium chloride 50% to 70% plus calcium fluoride 50% to 30%. This bath runs between temperatures of 1850° to 2300° F. and is made by first running the furnace with the barium chloride to saturate the brick lining and then bailing out, for example, 50% barium chloride and adding 50% calcium fluoride.

It is to be understood that after the first chloride treatment of the pot, additional treatments need not be made for additional charges of suitable bath material. When the bath is being depleted by being mechanically removed when work is taken from the bath, the recharging is done with the chemicals mixed in the proper proportions for the bath intended.

The electrical furnace comprising the present invention also includes a definite type of electrode 6 comprising 88% to 92% nickel plus 12% to 8% of chromium. This type of electrode does not cause sludging or bath contamination when used in connection with the pot above specified when a chloride, or a chloride-fluoride salt bath is used therein, and, furthermore, these electrodes are satisfactory to temperatures up to and slightly beyond 2300° F.

It has been found by actual use that carbon and other metallic electrodes (especially iron alloys) when used in the pot herein specified in a chloride or chloride-fluoride bath causes contamination of the bath and sludging. This nickel-chromium is the most satisfactory alloy for electrodes that is known to applicant for the purpose intended.

In running a chloride or a chloride-fluoride salt bath in the present electrical furnace at temperatures up to 2100° F., it is desirable to use, as a covering for the salt bath, 25% silicon carbide, plus 75% graphite, either flake or 200 mesh screen fineness. This covering layer on top of the salt bath prevents oxidation of the bath and also tends to retard the escape of gases from the bath while the same is operating.

A salt bath furnace in accordance with the present invention has from three to four times the life of salt bath electrical furnaces that have heretofore been developed in the art, for use with chloride baths.

What I claim is:

1. An electric furnace for use with a chloride, or a chloride-fluoride salt bath comprising a pot having a lining of silica-alumina refractory bricks impregnated with alumina, and processed, after filling said pot to slightly above normal operating level with the predominant chloride of the bath to be normally used in said pot, by heating said chloride to a temperature between 1300° F. and 2300° F. for a period of from ten to forty-eight hours.

2. An electric furnace for use with a chloride, or a chloride-fluoride salt bath, a lining comprising a refractory impregnated with alumina and saturated with the predominant chloride of the bath to be used in said furnace by heating said chloride while in the furnace to a temperature of 1300° F. to 2300° F. for a period of from ten to forty-eight hours, in combination with electrodes comprising 88% to 92% nickel plus 12% to 8% chromium.

3. An electric furnace for use with a chloride, or a chloride-fluoride salt bath comprising a pot having a lining of silica-alumina refractory bricks impregnated with alumina, in combination with electrodes comprising 88% to 92% nickel plus 12% to 8% chromium.

4. An electric furnace for use with a chloride, or a chloride-fluoride salt bath comprising a lining of fired refractory impregnated with alumina, and refired to a temperature substantially the same as that at which said refractory was originally fired, in combination with electrodes comprising 88% to 92% nickel plus 12% to 8% chromium.

5. An electric furnace for use with a chloride or a chloride-fluoride salt bath comprising a pot having a lining of silica-alumina brick coated and impregnated with alumina and heat treated to a temperature of 1300° F. to 2300° F. for a period of from ten to forty-eight hours with the predominant chloride of the bath to be used in said pot, in combination with electrodes comprising 88% to 92% nickel plus 12% to 8% chromium.

6. An electric furnace for use with a chloride, or a chloride-fluoride salt bath comprising a lining of fired refractory impregnated with alumina and refired at substantially the same temperature at which the refractory was originally fired.

ARTEMAS F. HOLDEN.